United States Patent [19]

Rossmann

[11] Patent Number: 4,563,128

[45] Date of Patent: Jan. 7, 1986

[54] CERAMIC TURBINE BLADE HAVING A METAL SUPPORT CORE

[75] Inventor: Axel Rossmann, Karlsfeld, Fed. Rep. of Germany

[73] Assignee: MTU Motoren-und Turbinen-Union Muenchen GmbH, Munich, Fed. Rep. of Germany

[21] Appl. No.: 581,198

[22] Filed: Feb. 17, 1984

[30] Foreign Application Priority Data

Feb. 26, 1983 [DE] Fed. Rep. of Germany ....... 3306896

[51] Int. Cl.[4] .......................... F01D 5/18; F01D 5/28
[52] U.S. Cl. ..................... 416/92; 416/225; 416/241 B
[58] Field of Search ................ 416/225, 241 B, 92

[56] References Cited

U.S. PATENT DOCUMENTS

| | | | |
|---|---|---|---|
| 2,479,057 | 8/1949 | Bodger | 416/204 A X |
| 3,844,728 | 10/1974 | Copley | 416/225 |
| 4,221,540 | 9/1980 | Savonuzzi | 416/241 B X |
| 4,247,259 | 1/1981 | Saboe et al. | 416/92 X |
| 4,285,634 | 8/1981 | Rossman et al. | 416/241 B |
| 4,314,794 | 2/1982 | Holden | 416/241 B X |
| 4,396,349 | 8/1983 | Hueber | 416/241 B X |
| 4,471,008 | 9/1984 | Huther | 416/241 B |
| 4,473,336 | 9/1984 | Coney et al. | 416/225 X |

FOREIGN PATENT DOCUMENTS

| | | | |
|---|---|---|---|
| 2102803 | 7/1971 | Fed. Rep. of Germany | 416/225 |
| 2834843 | 6/1980 | Fed. Rep. of Germany | . |
| 2945531 | 1/1982 | Fed. Rep. of Germany | . |
| 55020 | 6/1951 | France | 416/189 R |
| 57426 | 1/1953 | France | 416/193 A |
| 2463849 | 4/1981 | France | 416/241 B |
| 2027496 | 2/1980 | United Kingdom | 416/241 B |

Primary Examiner—Everette A Powell, Jr.
Attorney, Agent, or Firm—W. G. Fasse; D. H. Kane, Jr.

[57] ABSTRACT

A hot gas impinged turbine blade suitable for use under super-heated gas operating conditions has a hollow ceramic blade member and an inner metal support core extending substantially radially through the hollow blade member and having a radially outer widened support head. The support head has radially inner surfaces against which the ceramic blade member supports itself in a radial direction on both sides of the head. The radially inner surfaces of the head are inclined at an angle to the turbine axis so as to form a wedge or key forming a dovetail type connection with respectively inclined surfaces of the ceramic blade member. This dovetail type connection causes a compressive stress on the ceramic blade member during operation, whereby an optimal stress distribution is achieved in the ceramic blade member.

20 Claims, 11 Drawing Figures

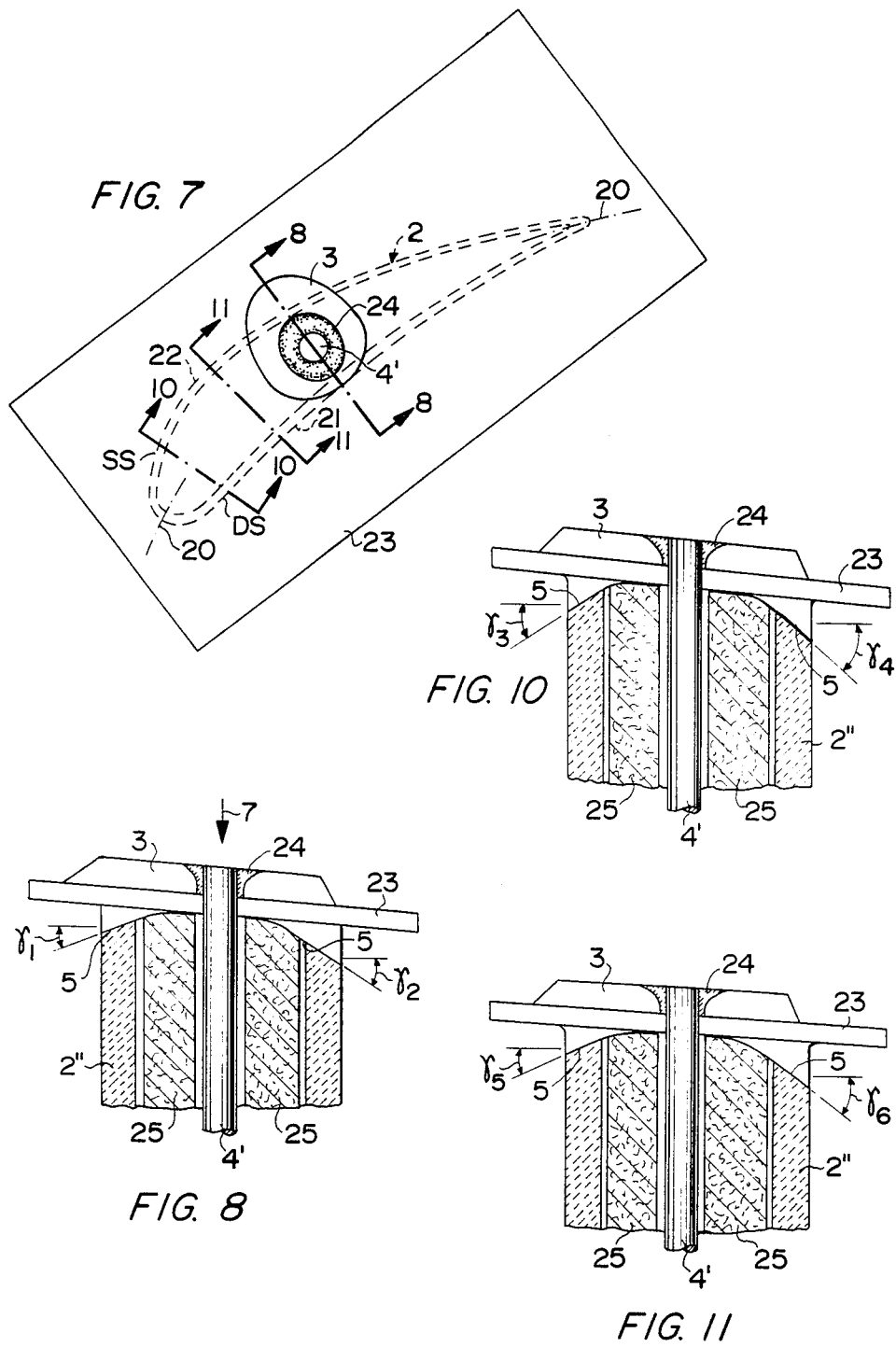

CERAMIC TURBINE BLADE HAVING A METAL SUPPORT CORE

FIELD OF THE INVENTION

The invention relates to a turbine blade with a metal support core and an enveloping ceramic blade member for use under superheated gas operating conditions. The support core is held in a form-locking manner at its radially inward end by a turbine disk on a turbine shaft. The radially outward end of the core forms a widened support head. The ceramic blade member supports itself against the radially inner surfaces of the support head in a radial direction on both sides of the head, or on two opposite sides of the head.

DESCRIPTION OF THE PRIOR ART

A turbine blade of the aforementioned type is known from German Patent Publication DE-PS 2,945,531. In the known embodiment the ceramic blade is supported in a surface type manner on its radially outer side against an inner contact surface of the radially outer end of the widened support head. The contact surface extends perpendicularly to the radial or longitudinal blade axis. Tests have shown that in such perpendicular contact with unavoidable thermal expansion differences, unacceptably high tension and compression stresses arise in the contact surface of the ceramic, due to high frictional forces. Such tension and compression stress leads to crack formation and subsequent failure of the ceramic blade member.

German Patent Publication (DE-OS) 2,834,843 discloses a certain formation of the contact surface contours of a metal/ceramic hybrid blade. However, these known surface contours are curved or hook shaped providing a formlocking clamping without a gap between the ceramic blade and the metal core for fixing or securing the divided blade components. Such an arrangement cannot produce definite compressive stresses under centrifugal force through a wedging action and sliding movement.

OBJECTS OF THE INVENTION

In view of the above it is the aim of the invention to achieve the following objects singly or in combination:
to provide a ceramic turbine blade of the aforementioned type suitable for impingement by superheated gases, wherein the force or stress conditions in the blade are better controlled than heretofore;
to avoid spherically curved contact surfaces between the blade member and the support head and to use contact surfaces which give rise to compressive stresses on the blade member due to a force that is effective longitudinally on the blade, namely, in the radial direction, such as the centrifugal force;
to apply compressive stress on the support head of a support or mounting core as a result of the operation of a turbine, more specifically as a result of the rotation of the turbine motor;
to compensate for differences in the heat expansion of the ceramic blade member and the metallic mounting or supporting components of the ceramic blade member; and
to assure an optimally desirable stress distribution in a turbine blade made of ceramic and metal components.

SUMMARY OF THE INVENTION

The objects of the invention have been achieved according to the invention in that radially inner surfaces of a metallic support head are inclined at an angle $\gamma$ to the rotational turbine axis for forming a wedge or key, so that a dovetail type connection results with respectively inclined surfaces of a ceramic blade member, whereby the dovetail type connection causes a compression stress on the ceramic blade member during operation. As a result, protective compression stresses are superimposed on the head of the supporting metal core in the area of contact with the ceramic blade member. This feature is achieved by arranging the contact surfaces at an inclination so that the known forces such as centrifugal forces, thermal expansion forces, elastic spring type forces cause a corresponding compressive stress as a result of a wedging action, whereby the tension and shear stresses are held within acceptable limits and crack formation is practically prevented. Such a structure also compensates for thermal expansion differences between the ceramic blade member and the metal core by permitting shifting of the blade along the contact surfaces.

An advantageous embodiment of the invention is so constructed that the dovetail type connection is axially symmetric, that is, symmetric relative to the longitudinal, radial axis of the blade. Especially the angle $\gamma$ of inclination of a blade profile may be varied or differ around the perimeter of the blade support surface so that an appropriate optimal stress distribution is achieved on or in the blade. The inclination angle $\gamma$ of the contact surface relative to the turbine rotational axis is advantageously within the range of 10° to 70°.

Furthermore, in another embodiment according to the invention, the friction coefficient may be reduced through appropriately coating the contact surface on the metal side. For this purpose a ceramic spray coating is applied to the dovetail connection surface of the support head. This coating also serves as a good thermal insulation and further ensures a good fit of the contacting parts or surfaces relative to a micro scale. An appropriate ceramic spray coating is zirconium oxide, for example.

In an alternate embodiment, thin insulating shims or inserts are arranged in the dovetail connection in order to improve the friction and thermal conditions. Such shims are preferably made of aluminum titanate. The ceramic spray coating or the insulating shims may be arranged so as to completely surround the support head, for example in a wrap around manner so that any direct contact of the metal with the hot or super-heated gases is avoided thereby also avoiding any unacceptable heating of the metal of the core and of the core head.

The ceramic blade member in a different embodiment of the invention comprises a radially outwardly raised or projecting collar in the area of the dovetail connection of the support head. This collar forms an integral or one piece construction with the blade member. Consequently, the metallic support head is additionally shielded by the raised collar of the ceramic blade member.

The sectional profile or cross-sectional configuration of the support head need not necessarily correspond to the profile or cross-sectional configuration of the blade. Rather, in an example embodiment, the head may be elliptical or round in a radial top view and it may be smaller in its cross-sectional area than the blade profile.

This feature achieves advantageous contact conditions between the blade member and the support head.

If the profile of the metal support head clearly projects beyond the profile of the blade, the support head may be integrated into an outer shroud band of the turbine for example by brazing or welding.

BRIEF FIGURE DESCRIPTION

In order that the invention may be clearly understood, it will now be described, by way of example, with reference to the accompanying drawings, wherein.

FIG. 7 shows a to plan view onto a turbine blade and its support head according to arrow VII in FIG. 8, wherein the support head is rigidly built into the shroud band; and FIG. 8 is a sectional view through the radially outer end of a turbine blade and through the support head whereby the sectional plane extends along VIII—VIII in FIG. 7 and showing a securing bolt forming a support core, said bolt being connected to an outer support such as a shroud band, and with an insert such as metal wadding between the core and the blade member.

Figure 6:
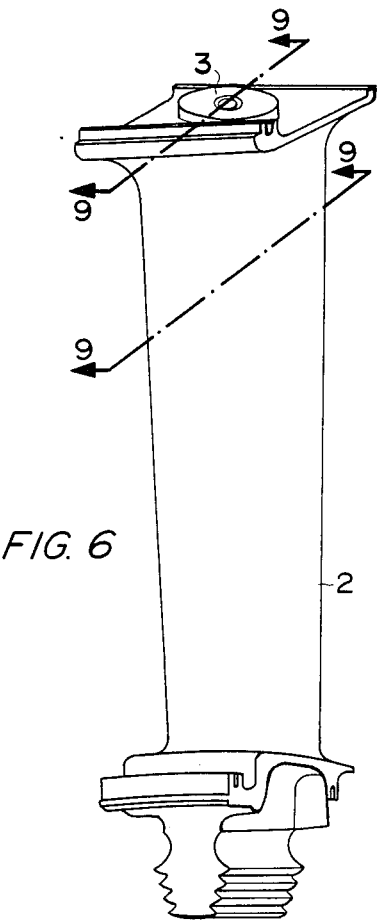
FIG. 6 is a perspective view of a turbine blade with a metal support head having at its radially outer end a larger cross-section than the respective ceramic blade member.
Figure 9:
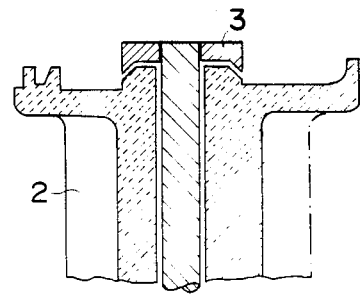

FIG. 9 is a sectional view through the radially outer end of a turbine blade as shown in FIG. 6, whereby the sectional plane extends radially along section lines IX—IX in FIG. 6;

FIG. 10 is a sectional view similar to that one of FIG. 8, whereby the sectional plane extends radially along section line X—X in FIG. 7;

FIG. 11 is a sectional view similar to that one of FIG. 8, whereby the sectional plane extends radially along section line XI—XI in FIG. 7.

DETAILED DESCRIPTION OF PREFERRED EXAMPLE EMBODIMENTS AND OF THE BEST MODE OF THE INVENTION

Figure 1:
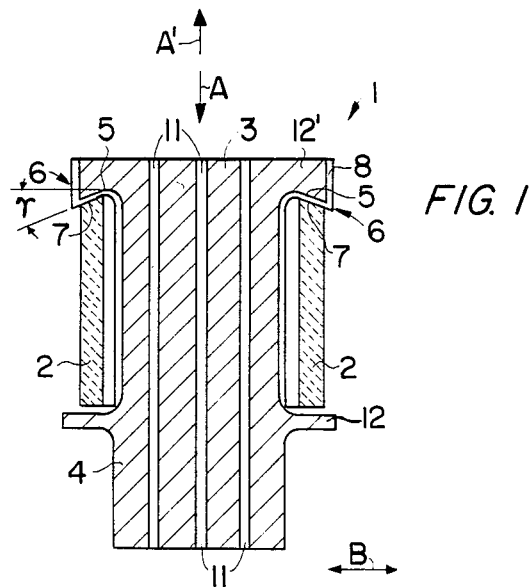
FIG. 1 shows schematically a sectional view through the support head area of a turbine blade according to the invention, whereby the sectional plane extends radially along section line 1—1 in FIG. 5, for example.

FIG. 1 shows a sectional view through the radially outer end of a ceramic turbine blade 1, whereby the radial direction is indicated by the arrow A and the direction of the rotational turbine axis is indicated by the arrow B. The blade 1 is constructed for being subjected to hot gas or super-heated gas. For this purpose the blade 1 comprises a metal support core 4 extending through a hollow ceramic blade member 2, only partially shown in FIGS. 1 and 2. The radially outer end of the core 4 comprises a widened support head 3 with radially spaced flanges 12 and 12'. Super alloys, especially those with a nickel base, have been proven to be especially useful as materials for the core 4 and its head 3. Cast parts of these alloys are preferred, especially those produced with a directionally controlled solidification. However, forged or powder-metallurgically produced materials, or especially single crystal materials are also suitable for making the core 4.

The ceramic blade member 2 according to the invention is arranged between the flange areas 12 and 12' of the support core head 3, as will be described below. Materials suitable for making the blade member 2 are especially silicon carbide SiC, silicon nitride $Si_3N_4$, and zirconium oxide $ZrO_2$. The silicon carbides may be silicon infiltrated. The silicon nitride and the zirconium oxide may either be dense- or reaction-sintered. Hot isostatic pressing has proven to be especially successful as a production method for making the ceramic blade member 2.

Figure 2:
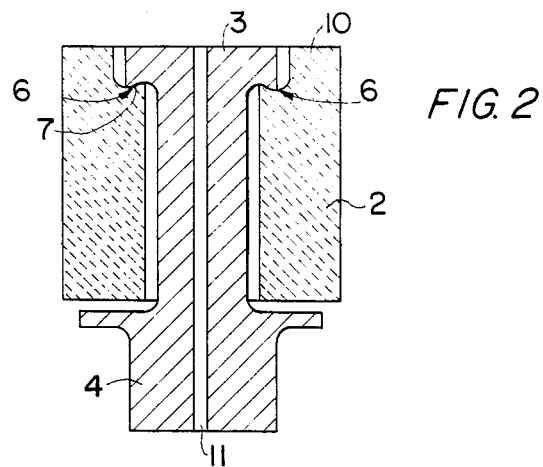
FIG. 2 shows a sectional view similar to that of FIG. 1, however, illustrating a different embodiment of the support head area.

A preferred embodiment of the turbine blade 1 according to the invention is one with air cooling. For this purpose, the support core 4 in FIG. 1 comprises several cooling air channels 11 running lengthwise, radially through the blade 1. In FIG. 2 only one such cooling air channel 11 is shown.

The radially inner flange area 12 of the support head 3 of the core 4 runs perpendicularly to the radial extension or length of the support core 4 in the direction of the arrow A. The radially outer flange area 12' of the support head 3 is constructed with a substantially flat or planar radially outermost surface, whereas the radially inner surfaces 5 of the support head 3 of the core 4 are inclined at an angle $\gamma$ relative to a direction extending in parallel to the turbine axis B as is shown especially in FIG. 1. Correspondingly inclined radially outer contact surfaces 7 at the end of the ceramic blade member 2 rest against these flat inclined surfaces 5 thereby forming a dovetail type connection 6.

The blade member 2 or 2' is divided into, for example two, blade components as shown in FIG. 7 along a dividing line 20. The blade component 21 forms with its outer surface DS the compression side of the blade 2'. The blade component 22 forms with its outer surface SS the suction side of the blade 2'. The blade components 21, 22 are held in contact by the inclined surfaces 5 shown in FIG. 1 or FIG. 8. These blade components 21, 22 are slightly shiftable substantially in the radial direction A e.g. by means of an elastic intermediate layer between their bottom surface and flange 12. According to the invention, controllable axial forces such as centrifugal forces, thermal expansion forces, elastic spring forces, etc. may be transmitted through a wedging action caused by the dovetail connection 6 as compressive stress to blade member 2 or 2'. This compressive stress is superposed on the also arising tensile and shear stresses in an unloading, or easing or compensating sense, whereby cracking is avoided.

Advantageously, the core head 3 is rigidly attached to or integrated with an upper support, e.g., a radially outer shroud band 23 shown schematically in FIGS. 7 and 8. Through an appropriate configuration of the core 4, e.g., through the choice of its cross-section, especially in the form of a bolt, the expansion characteristic of the metal core 4 may be favorably influenced, that is a spacially limited axial play may be achieved in the lengthwise direction of the blade 1, that is, in the radial direction A.

As shown in FIG. 7, the cross-section of the support core 4 may, for example, be selected for providing a considerably larger contact surface for the blade component 21 on the pressure side DS of the blade 2' than for the blade component 22 on the suction side SS.

The blade according to the invention is relieved of stresses caused by the above mentioned forces during operation, and unavoidable thermal expansion differences between the ceramic material of the blade member 2, 2' and the metal material of the support core 4 and support head 3 may be easily compensated. Thus, crack formations in the ceramic blade member 2, 2' is effectively prevented. Furthermore, the support core 4 and especially the support head 3 may be protected against thermal radiation from the blade member 2, 2', 2" by means of a thermal insulating insert or shim 9 shown in FIG. 3. This heat insulation shim 9 may be made of zirconium oxide, aluminum titanate, magnesium aluminum titanate, or lithium aluminum silicate in the form of an insert of fibers, felt, fleece, mat, or the like, which in turn is enveloped by metallic foil and comprises an outer surface which reflects heat radiation to the outside.

The control of the forces arising during operation is also made easier for any desired type of blade profile, e.g., an "airfoil" type of blade, in that the angle $\gamma$ of the inclined surfaces 5, 7 may be varied or varies around the perimeter of the support faces of the blade so that an appropriate optimal stress distribution results (look at different angles $\gamma_1$, $\gamma_3$, and $\gamma_5$ in FIGS. 8, 10, 11). The angle $\gamma$ is within a range of 10° to 70°. In the embodiment of FIG. 1 the angle $\gamma$ is preferably approximately 15°. In the embodiment of FIG. 8, two different angles $\gamma$ may be seen in cross-section. The angle $\gamma_2$ (and $\gamma_4$, $\gamma_6$ respectively) is larger than the angle $\gamma_1$ ($\gamma_3\gamma_5$) in an area in which larger forces, especially compressive stresses, must be transmitted.

As shown in FIG. 1, the metallic support core 4 is provided on its surface in an advantageous manner with a ceramic spray coating 8, for example of zirconium oxide, or similar oxide coatings. The coating 8 covers at least the area of the support head 3 in the zone of the dovetail type connection 6 and the inclined wedging surfaces 5 as well as the total area between the outer flange 12' and the inner flange 12 part of which may form a shroud band. Such spray coating 8 reduces the friction coefficient of the radially inner surfaces 5 of the metal support head 3 of the core 4. Further, the spray coating 8 provides a good fit and adhesion, on a micro scale, between the cooperating surfaces. A thermal isolation of the metal support head 3 is also achieved by the spray coating 8. Furthermore, the spray coating 8 is intended to provide an effective protection against gas particles of the combusting hot gas, which impinge upon the support head 3 during operation.

Compared to FIG. 1, the example embodiment of the invention shown in FIG. 2 illustrates only slight differences. In FIG. 2, the blade member 2 comprises radially outer collars 10, which additionally shield the metal support head 3 of the support core 4. As may be seen, the shape and dimensions of the metal core 4 and its enveloping blade member 2 differ from the embodiment of FIG. 1. At least one cooling channel 11 should, however, pass centrally through the support core 4 and head 3. The choice of the angle of the dovetail connection 6 may again be made axially symmetric or varying around the perimeter of a turbine rotor, compare FIGS. 1 and 8.

Figure 3:
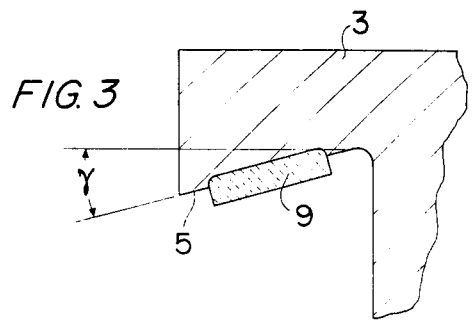
FIG. 3 shows a detail of a further embodiment of the invention in a sectional view as in FIG. 1.
Figure 4:
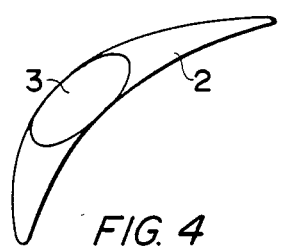
FIG. 4 is a top plan view onto a ceramic blade with a support head having an elliptical cross-section, whereby the viewing direction is shown by the arrow A in FIG. 1 and extends radially inwardly relative to a rotational turbine axis indicated by an arrow B in FIG. 1.
Figure 5:
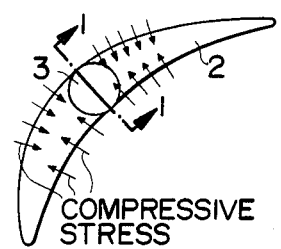
FIG. 5 is a view similar to FIG. 4, but with a round support head, whereby the arrow A in FIG. 1 again indicates the viewing direction.

In the example embodiment according to FIG. 3, the thin shim or inserts 9, for example of aluminum titanate, iron titanate, zirconium dioxide, or similar high strength ceramic spray coatings are set into or applied onto the inclined surfaces 5 of the metal support head 3. In their function these inserts or shims 9 are supposed to at least partially replace the ceramic spray coating 8 of the example embodiment of FIG. 1. Specifically, the shims 9 provide a small friction and a good thermal insulation between the support head 3 and the blade member 2. As shown in FIG. 4 or 5, and also in FIG. 7, the support head 3 does not have to correspond to the profile of the blade or its hollow interior space. Instead, it may comprise an elliptical, circular, or any other cross-sectional shape deviating from a circular cross-section, in order to adapt the contact surface to the known forces which must be transmitted.

If the profile of the metal support head 3 of the support core 4 clearly projects radially beyond the blade profile as shown in FIG. 6 and FIG. 8, the radially outer flange area of the head 3 may be rigidly built into or connected to an outer shroud band 23 of a turbine, especially through high temperature soldering, or brazing or welding shown at 24 in FIG. 8, whereby the core in the form of a bolt 4' extends into the head 3. FIG. 8 further shows filler material 25 surrounding the bolt 4' inside the ring space in the hollow ceramic blade member 2". The filler material 25 may, for example be a so-called metal felt, and saves ceramic material.

The preferred use of the invention is in gas turbine engines, especially with air-cooled, divided, profiled blades; that is in stationary gas turbine arrangements as well as in turbines of aircraft engines.

Although the invention has been described with reference to specific example embodiments, it is to be understood, that it is intended to cover all modifications and equivalents within the scope of the appended claims.

What is claimed is:

1. In a hot gas turbine blade having a metal support core and a ceramic blade member held by said metal support core for use under superheated gas operating conditions, said ceramic turbine blade member having a longitudinal blade axis extending substantially radially relative to a rotational turbine axis, the improvement comprising a metal support head at a radially outer end of said metal support core, said metal support head having blade support shoulders with surfaces facing substantially radially inwardly, said blade support surfaces of said blade support shoulders being inclined at an angle ($\gamma$) relative to said turbine axis to form a dovetail configuration, said ceramic turbine blade member having blade bearing shoulders with correspondingly inclined radially outwardly facing surfaces at a radially outer end of the respective blade member, said inclined surfaces of said blade bearing shoulders engaging said blade support surfaces of said metal support head in a form-locking manner for forming a dovetail type connection between said metal support head and said ceramic turbine blade and for applying a compressive stress to said ceramic turbine blade member in operation, said compressive stress being effective substantially in a direction extending perpendicularly to said longitudinal axis of said turbine blade member, said radially inwardly and said radially outwardly facing surfaces cooperating with each other for permitting shifting of the blade member along said surfaces for compensating thermal expansion differences between the ceramic blade member and the metal support core.

2. The turbine blade of claim 1, wherein said inclined surfaces are located in pairs and symmetrically on opposite sides of said radially extending blade axis.

3. The turbine blade of claim 1, wherein said angle ($\gamma$) of said inclined surfaces varies around the perimeter of the blade support surfaces (FIGS. 7, 8, 10, 11).

4. The turbine blade of claim 1, wherein said inclined surfaces are located in pairs on opposite sides of said radially extending blade axis, and wherein each inclined surface of a pair has its own angle ($\gamma_1$, $\gamma_2$) of inclination so that the angle ($\gamma_2$) of inclination on the pressure side of said blade member is larger than than the angle ($\gamma_1$) of inclination on the suction side of said blade member.

5. The turbine blade of claim 1, further comprising a ceramic spray coating (8) on at least one of said inclined surfaces cooperating in forming said dovetail type connection, said ceramic spray coating forming a heat insulating layer which simultaneously reduces friction.

6. The turbine blade of claim 5, wherein said ceramic spray coating covers said support core head substantially entirely.

7. The turbine blade of claim 5, wherein said ceramic spray coating is zirconium oxide.

8. The turbine blade of claim 1, further comprising an intermediate insulating shim (9) interposed between said cooperating inclined surfaces for providing a heat insulation between said inclined surfaces.

9. The turbine blade of claim 8, wherein said insulating shim (9) is aluminum titanate.

10. The turbine blade of claim 8, wherein said insulating shim (9) covers said support core head substantially entirely.

11. The turbine blade of claim 1, further comprising a radially outwardly extending collar (10) forming an integral extension of said ceramic turbine blade member, said collar (10) being located adjacent to said dovetail type connection.

12. The turbine blade of claim 1, wherein said support head of said support core has an elliptical or circular shape as viewed in the radial direction, and wherein said elliptical or circular shape is smaller than a sectional profile surface area of the respective turbine blade member.

13. The turbine blade of claim 1, wherein said support head of said support core has a configuration as viewed in the radial direction which projects at least partially outside a sectional profile surface area of the respective turbine blade member, said support head further comprising means for connecting said support head to a turbine shroud band.

14. The turbine blade of claim 1, wherein said turbine blade member comprises two blade components fitting to each other along an interface surface, each blade component having its respective inclined surface for cooperation with the respective inclined surface of said support core head, said two blade components being adjustable relative to each other by a sliding movement between said cooperating inclined surfaces, said sliding movement extending substantially in parallel to said rotational turbine axis.

15. The turbine blade of claim 1, further comprising cooling air ducts extending substantially radially through said support core.

16. The turbine blade of claim 1, further comprising means for connecting said support head of said support core to a radially outer mounting means such as a turbine shroud band.

17. The turbine blade of claim 16, wherein said connecting means comprise a brazed connection.

18. The turbine blade of claim 16, wherein said connecting means comprise a welded connection.

19. The turbine blade of claim 1, wherein said support core inside said ceramic blade member has a freely selectable cross-sectional shape.

20. The turbine blade of claim 1, wherein said turbine blade member has a substantially radially extending hollow passage therethrough, said support core extending through said passage, said hollow passage having a cross-sectional area of given size, said support core having a cross-sectional area relatively smaller than said given size for forming a hollow ring space around said support core in said hollow passage, said turbine blade further comprising a filler material located in said hollow ring space.

* * * * *